United States Patent
Fuchs (10) Patent No.: US 7,926,640 B2
(45) Date of Patent: Apr. 19, 2011

(54) TRANSPORT DEVICE FOR CONTINUOUSLY REMOVING MINED MATERIAL

(75) Inventor: Manfred Fuchs, Kapfenberg (AT)

(73) Assignee: Sandvik Mining and Construction Materials Handling GmbH & Co KG, Leoben (AT)

( * ) Notice: Subject to any disclaimer, the term of this patent is extended or adjusted under 35 U.S.C. 154(b) by 475 days.

(21) Appl. No.: 11/988,603

(22) PCT Filed: Jul. 6, 2006

(86) PCT No.: PCT/AT2006/000292
§ 371 (c)(1),
(2), (4) Date: Oct. 8, 2008

(87) PCT Pub. No.: WO2007/006066
PCT Pub. Date: Jan. 18, 2007

(65) Prior Publication Data
US 2009/0078542 A1   Mar. 26, 2009

(30) Foreign Application Priority Data

Jul. 13, 2005 (AT) .................. A 1182/2005

(51) Int. Cl.
*B65G 15/08* (2006.01)
*E21F 13/02* (2006.01)

(52) U.S. Cl. ........ 198/314; 198/313; 198/715; 198/819; 299/18; 299/64

(58) Field of Classification Search .................. 198/311, 198/312, 313, 314, 680, 715, 819, 842, 845; 299/18, 64
See application file for complete search history.

(56) References Cited

U.S. PATENT DOCUMENTS

| 4,061,223 A | * | 12/1977 | McGinnis ...................... 198/821 |
| 4,173,373 A |   | 11/1979 | Campbell et al. |
| 4,202,442 A | * | 5/1980 | David ........................... 198/820 |
| 4,312,540 A | * | 1/1982 | Thompson ...................... 299/11 |
| 4,380,288 A |   | 4/1983 | Bodimer et al. |
| 4,758,049 A | * | 7/1988 | Wernigg et al. .................. 299/33 |
| 4,883,167 A | * | 11/1989 | Shibata ......................... 198/712 |
| 5,524,548 A | * | 6/1996 | Fox .................................. 104/89 |
| 5,660,266 A | * | 8/1997 | Nolte ............................. 198/711 |
| 6,164,440 A | * | 12/2000 | Van Bree ................. 198/867.11 |
| 6,698,843 B2 | * | 3/2004 | Mraz ............................... 299/18 |
| 6,863,174 B1 | * | 3/2005 | Trieb ............................. 198/838 |
| 7,739,959 B2 | * | 6/2010 | Hutchinson ..................... 104/89 |
| 2003/0173818 A1 |   | 9/2003 | Trevis et al. |

FOREIGN PATENT DOCUMENTS

| DE | 1 807 383 | 8/1970 |
| DE | 31 25 580 A1 | 1/1983 |
| DE | 32 03 177 C1 | 2/1983 |
| DE | 196 05 713 A1 | 8/1997 |
| EP | 0 286 637 A1 | 10/1988 |

* cited by examiner

*Primary Examiner* — Douglas A Hess
(74) *Attorney, Agent, or Firm* — Chapman and Cutler LLP (57) ABSTRACT

In a haulage device for the continuous removal of material excavated below ground, which can be continuously slaved between a mining machine (8) and a continuous road haulage means (2) over a defined path and narrow curve radii of the mining machine (8) while continuously hauling without interruption, the haulage device is configured as a closed-belt conveyor (9) which is movable on a suspended rail system (3), whose receiving end adjacent the mining machine (8) is coupled with a movable transfer conveyor (7) and whose end facing away from the mining machine (8) and adjacent the continuous road haulage means (2) is connected with a clamping device exerting a defined tensile stress over a defined displacement path of the transfer end of the closed-belt conveyor (8) in a displaceable transfer position onto the continuous road haulage means (2).

18 Claims, 8 Drawing Sheets

TRANSPORT DEVICE FOR CONTINUOUSLY REMOVING MINED MATERIAL

BACKGROUND OF THE INVENTION

The invention relates to a haulage device for the continuous removal of material excavated below ground, which can be continuously slaved between a mining machine and a continuous road haulage means over a defined path and narrow curve radii of the mining machine while continuously hauling without interruption.

For the haulage of material won by underground mining, various haulage methods have become known. In principle, it is, for instance, feasible to initially provide a driving road, departing from which the desired material will then be excavated laterally of the road. Normally, conventional belt conveyors which need to master only small lateral excursions over extended lengths will do for "long wall mining". In a mining method such as, for instance, the "room and pillar" method, the material is excavated from rooms or chambers, with pillars being each left to support the roof, wherein, taking into account the respectively left pillars, road haulage means have to cope with frequent changes of direction and narrow curve radii, and a conventional road haulage means, for instance, in the form of subsequently installed conveyor belts may be arranged in the road at a point located further downstream. In order to enable the transport from the actual mining or winning site to a road haulage means even in the event of such narrow curves, WO 2005/056981 has already proposed to use so-called shuttle vehicles to transport material from the driving machine and, hence, from the mine face to a stationary haulage device arranged in the road further downstream. In the region of the road, no passing place is, as a rule, provided for such vehicles, and the use of such shuttle vehicles has, therefore, been accordingly optimized.

Such shuttle vehicles must, in turn, be designed to be extremely curve-going. The use of such shuttle cars will also affect the continuity of the haulage, with the transport car to arrive next always having to be awaited before the next haulage away from the cutting machine can be realized.

The invention aims to provide a haulage device of the initially defined kind, which enables the continuous haulage even in the event of narrow curve radii and mining being, for instance, performed according to the known room and pillar method.

BRIEF SUMMARY OF THE INVENTION

To solve this object, the configuration according to the invention, of the continuous haulage device essentially consists in that the haulage device is configured as a closed-belt conveyor which is movable on a suspended rail system and whose receiving end adjacent the mining machine is coupled with a movable transfer conveyor and whose end facing away from the mining machine and adjacent the continuous road haulage means is connected with a clamping device exerting a defined tensile stress over a defined displacement path of the transfer end of the closed-belt conveyor in a displaceable transfer position onto the continuous road haulage means. Due to the fact that a closed-belt conveyor movable on a suspended rail system is used as an intermediate conveyor between the mining machine and the stationary road haulage means, continuous haulage is feasible even in this usually very curvy section, whereby the continuous pursuit of this intermediate conveyor device or closed-belt conveyor is enabled by the arrangement of a suspended rail track, via which the entire closed-belt conveyor can be displaced in the rail direction. In order to again ensure, in such a configuration, that the necessary tensile force of the closed-belt conveyor will be maintained, it is provided according to the invention that a clamping device is arranged on the end facing away from the mining machine and neighboring the continuous road haulage means, which clamping means exerts a defined tension over a defined displacement path of the transfer end and, hence, of the closed-belt conveyor, wherein it is feasible to constantly hold the transfer end of the closed-belt conveyor above an already laid stationary haulage means over a defined distance during displacement so as to enable the same to be approached to the road haulage means in a correct transfer position over a predetermined path.

In a particularly advantageous manner, the configuration according to the invention is devised such that the clamping device is comprised of a rope winch which is stationarily fixed in the road and whose rope can be motorically wound up and off and is connected with a tension monitoring device such as, e.g., a torque coupling. Such a torque coupling may be designed as a simple sliding clutch. Naturally, also electronic or electric/hydraulic control methods may be applied to respectively slave the rope winch motor in the desired manner so as to keep a predefined tensile force in a window of two tensile force values.

In a particularly advantageous manner, the configuration according to the invention is devised such that the receiving end of the closed-belt conveyor is mounted in a carrier coupled with the transfer car and displaceably mounted on the suspended rail, so as to be displaceable transversely to the longitudinal direction of the suspended rail while forming a funnel-shaped delivery end, the displaceable transfer conveyor preferably comprising a receiving hopper with an integrated crushing means, an upward conveyor and a transfer chute or delivery site connected with the carrier of the funnel-shaped end of the closed-belt conveyor. In this manner, a readily displaceable closed-belt conveyor construction is provided, which may be coupled with the drive of the transfer car so as to cause the closed-belt conveyor to immediately follow at a displacement of the transfer car while maintaining the respective tension in the previously described fashion.

Closed-belt conveyors are basically known, for instance, from EP 286637, wherein an endless flexible belt is employed, which, in the closed state, comprises two belt edge sections oriented in the same direction. Tail stations for such continuous conveyor belts are, for instance, described in EP 765287. In principle, a closed-belt conveyor known per se may, thus, be used, which is preferably designed in such a manner as to comprise two tensile force-absorbing elements on the belt edge sections, which project into the same direction transversely to the conveying direction and are adjacently located parallel with each other in closed sections, wherein the suspension members of the suspended rail preferably each comprise a carrier including support rollers each engaging from below, and rollingly supporting, one of the tensile force-absorbing elements of the belt edges directly and the second one of the tensile force-absorbing elements of the belt edges via the interposition of the first element, and that on the carrier at least two support wheels arranged transversely to the belt running direction cooperate with the tensile force-absorbing elements and keep the belt edges closed.

The suspension members themselves in such a configuration may simply be interconnected via link rods to ensure uniform distances between the suspension members.

So far, mining according to the room and pillar method in order to provide continuous haulage has always used individual conveyor belts which are displaceable on the floor, yet also belt conveyors which are suspended from a monorail can, for instance, be taken from U.S. Pat. No. 4,339,031. Such configurations are, however, unsuitable for narrow curves, since such conveyor belts, in the first place, serve to bridge straight sections.

The transfer of material onto displaceable intermediate storage means such as, for instance, hopper cars with integrated anchor drilling and setting devices, can be taken from U.S. Pat. No. 4,173,373. However, according to the invention, the configuration in a particularly advantageous manner is devised such that the transfer conveyor comprises at least one anchor drilling and setting device, by which anchors can be set to provide an extension of the suspended rails so as to enable, in a single operation, the respectively required extension of the monorail in order to accordingly enable the continuous slaving of the closed-belt conveyor configuration employed.

BRIEF DESCRIPTION OF THE DRAWINGS

In the following, the invention will be explained in more detail by way of details of an exemplary embodiment schematically illustrated in the drawing.

Therein.

DETAILED DESCRIPTION OF THE INVENTION

Figure 1:
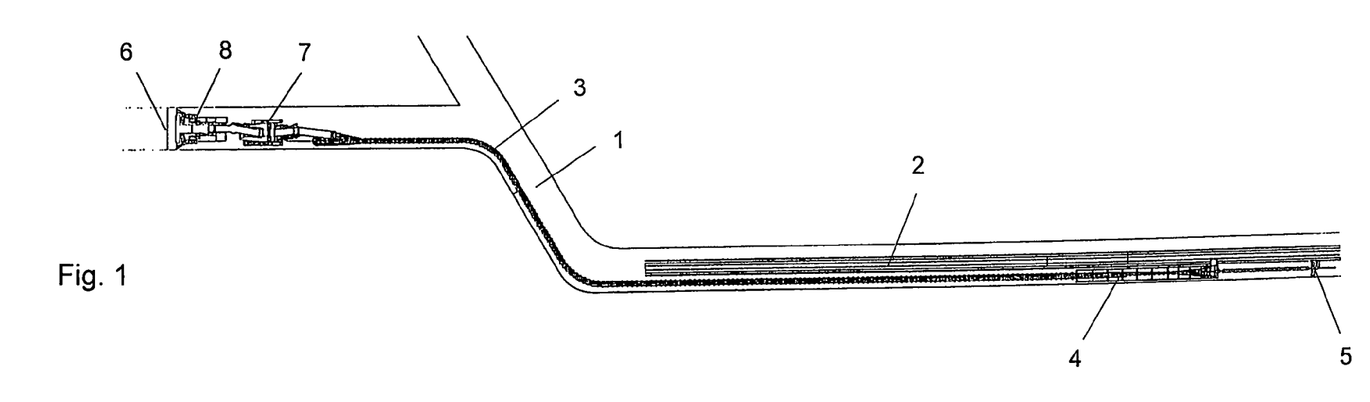
FIG. 1 is a schematic top view on the haulage device according to the invention in a first position.
Figure 2:
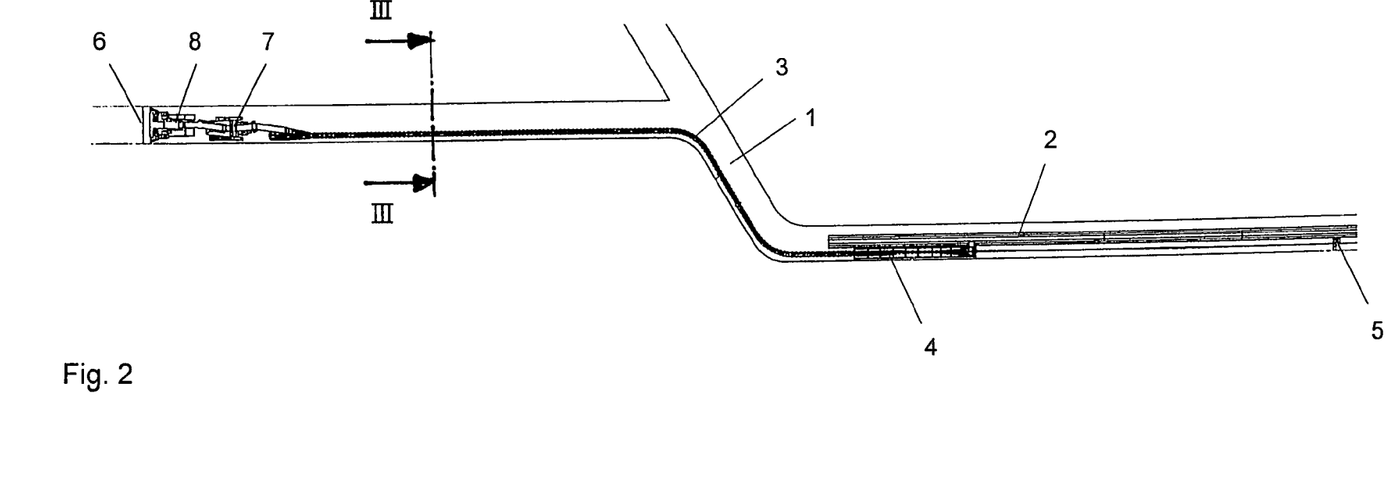
FIG. 2 is a top view corresponding to FIG. 1 in an accordingly advanced position.

From FIG. 1, a road section 1 is apparent, in whose rear section a road haulage means 2 comprised of elongate belt conveyors supported on the floor is provided. An overhead track denoted by 3 is guided to run around relatively narrow curve radii and carries a closed-belt conveyor whose transfer end is schematically indicated at 4. At the position denoted by 5, a rope of a clamping device is each fixed to enable the displacement of the closed-belt conveyor in the longitudinal direction of the rail 3 to the mine face schematically indicated by 6. The transfer conveyor 7 and the winning or mining machine 8 are, moreover, schematically depicted in the illustration according to FIGS. 1 and 2. When comparing FIGS. 1 and 2, it is apparent that the closed-belt conveyor in FIG. 2, relative to the stationary haulage means 2, has been pulled forward into a position in which the mining machine 8 was again ready to operate while enabling the continuous haulage over the entire region.

Figure 3:
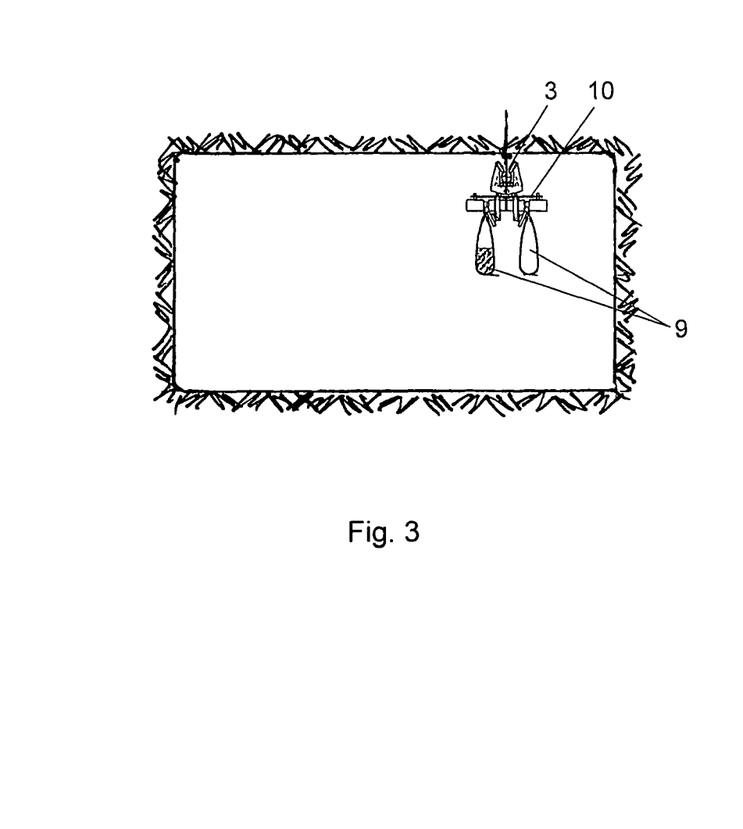
FIG. 3 illustrates a section along line III-III of FIG. 2.
Figure 4:
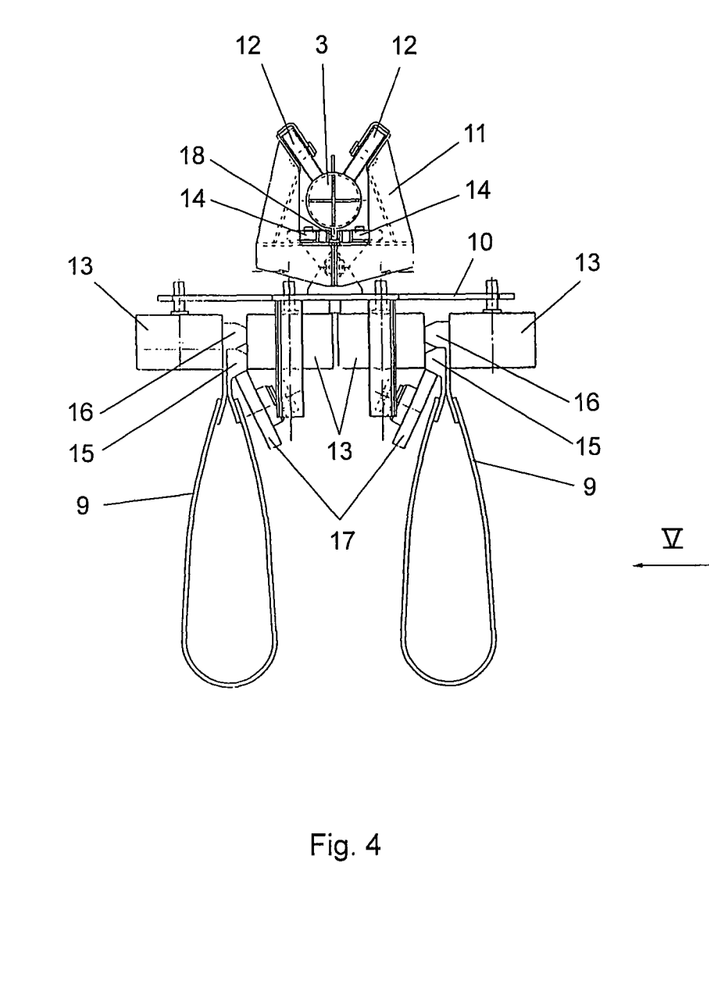
FIG. 4 is a partially sectioned view of the closed-belt conveyor in the conveying direction.
Figure 5:
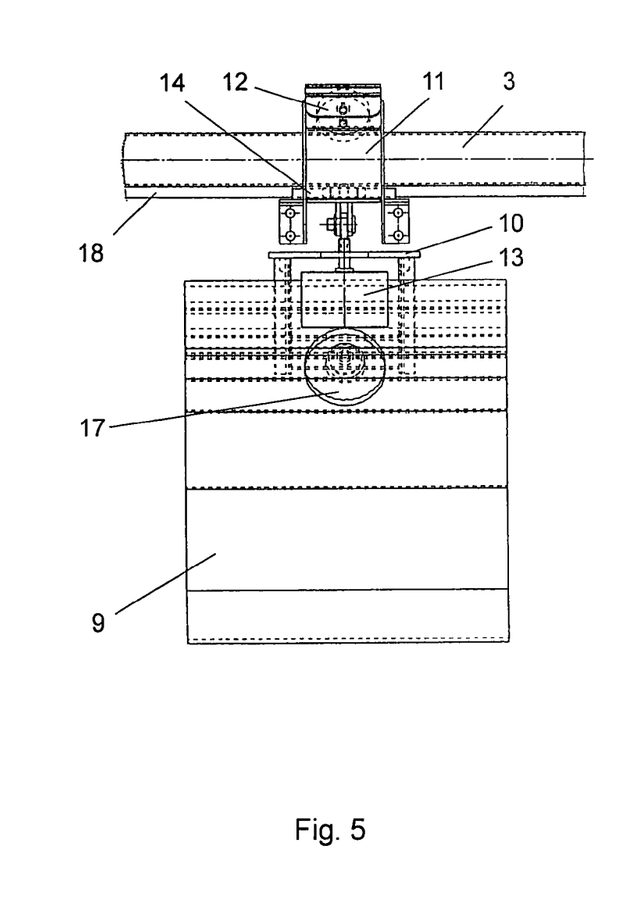
FIG. 5 is a side view along arrow V of FIG. 4.
Figure 6:
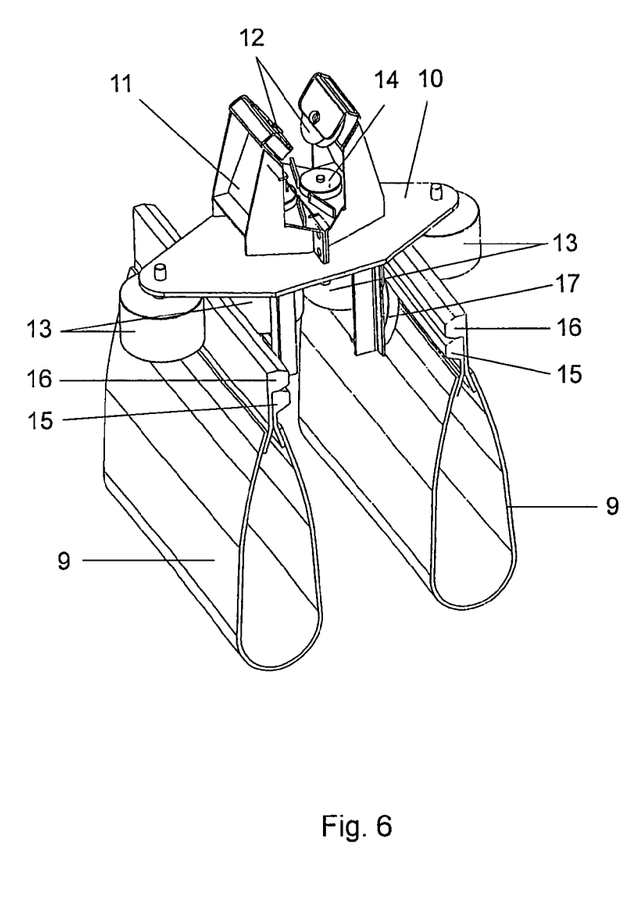
FIG. 6 a perspective view of the configuration according to FIG. 4.

From the illustration according to FIG. 3, the closed belts 9 are apparent, the returning closed belt filled with material being shown on the left-hand side and the empty closed belt being shown on the right-hand side. The closed belts are mounted in a carrier 10, which in turn is supported via rollers on rails 3. FIGS. 4, 5 and 6 depict details of the suspension members. The carrier 10 is suspended from the rail 3 via articulated tongs 11 and rollers 12 and, in turn, carries horizontal rollers 13 which keep the tensile force-absorbing elements 15 and 16 of the two belt edges of the closed-belt conveyor 9 in their closed positions. The said tensile force-absorbing elements 15 and 16 are held on the carrier via support rollers 17, which are in turn fixed to the carrier 10. The reference numerals of FIG. 4 have been retained in FIGS. 5 and 6, which elucidate the concrete configuration in a side view and a perspective view, respectively. Any lateral evasion of the tongs 11 by an undesired extent will be prevented by the respective support rollers 14, which cooperate with a substantially vertical or seam-right projection 18 of the guide rail or monorail 3.

Figure 7:
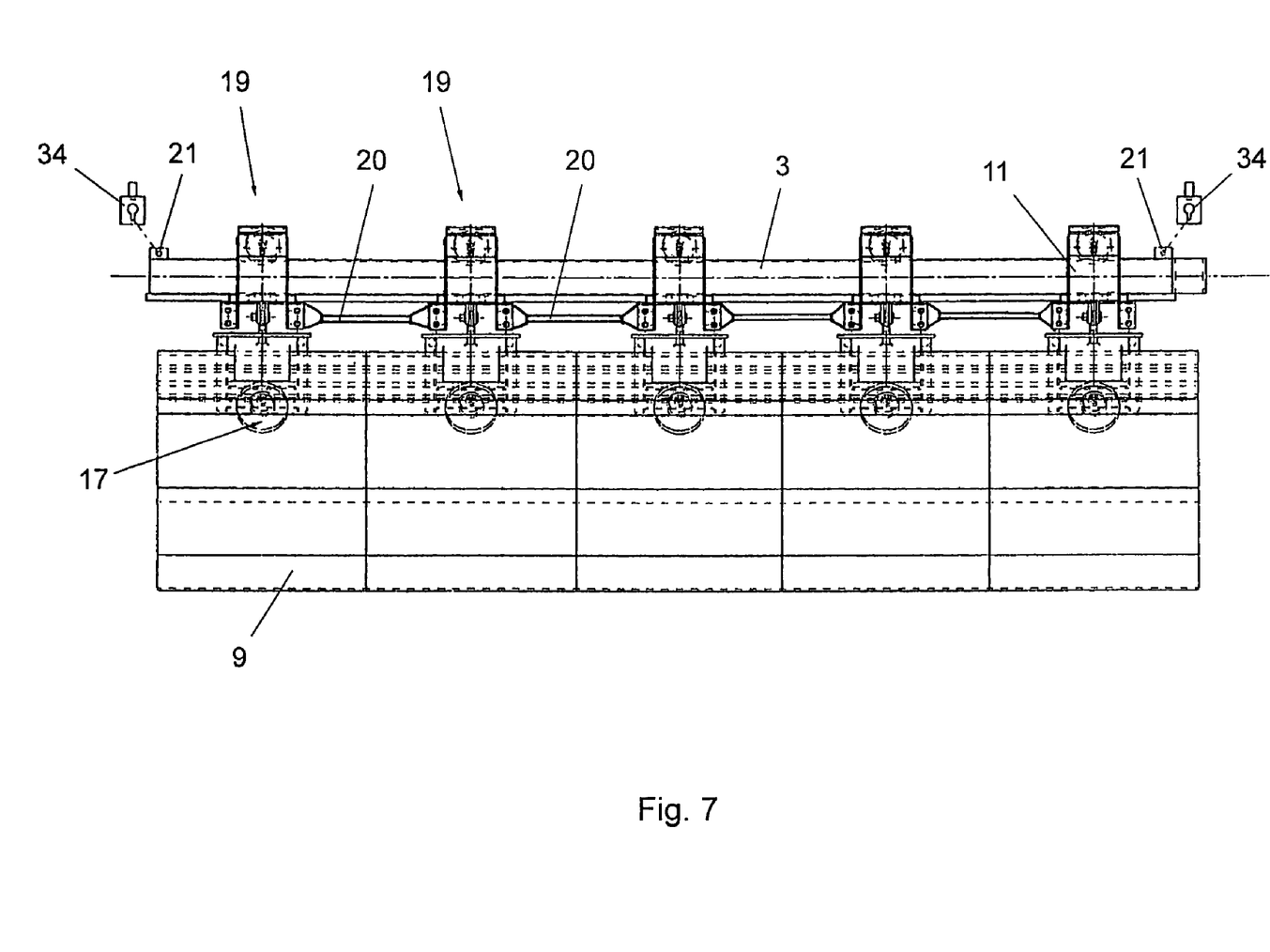
FIG. 7 depicts a plurality of interlinked and articulately connected closed-belt conveyor sections in an illustration corresponding to FIG. 5.

In the illustration according to FIG. 7, a plurality of such suspension members 19 are interlinked by coupling rods 20, wherein, moreover, suspension eyes 21 are visible, which serve to fix the extensible monorail or suspension rail 3 to the roof.

Figure 8:
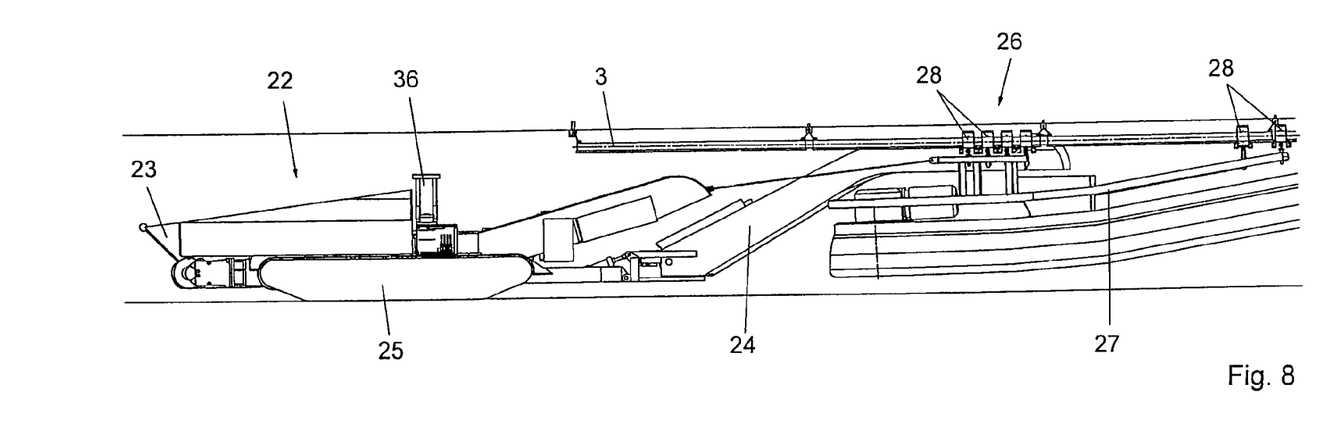
FIG. 8 is a side view of the transfer conveyor with the transfer end of the closed-belt conveyor and FIG. 9 a top view on the illustration according to FIG. 8.
Figure 9:
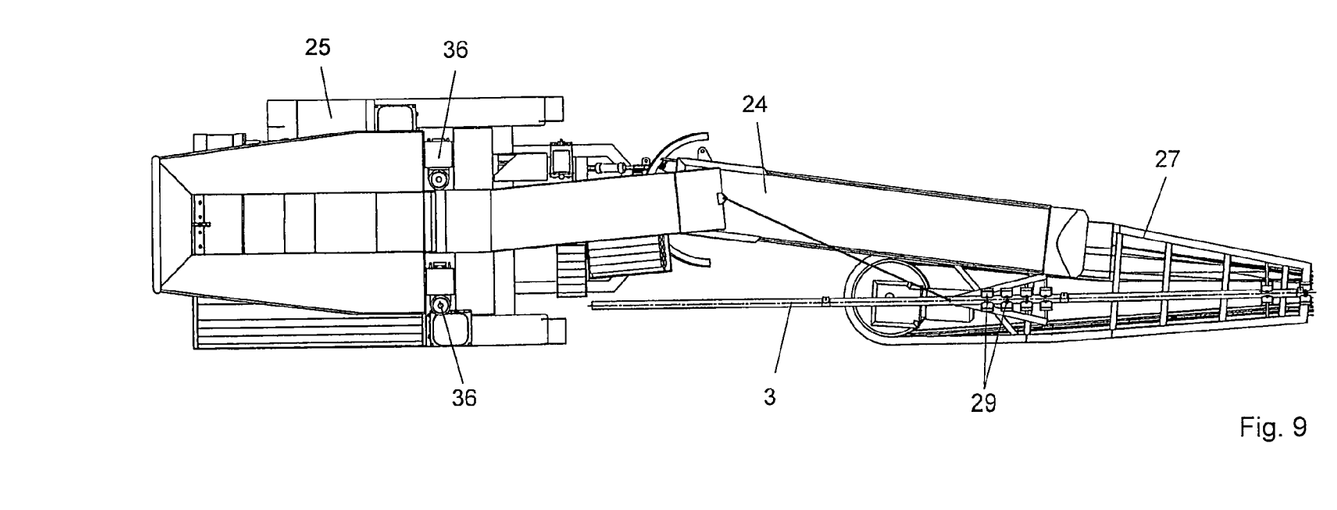
Figure 10:
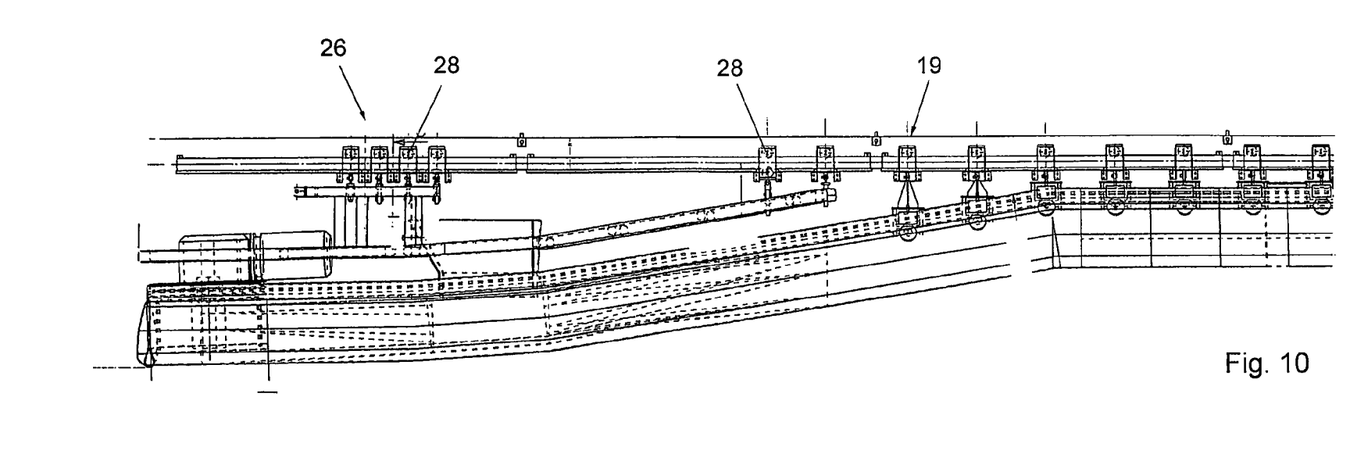
FIGS. 10 and 11 are a side view and a top view, respectively, on the carrier of the receiving end of the closed-belt conveyor.
Figure 11:
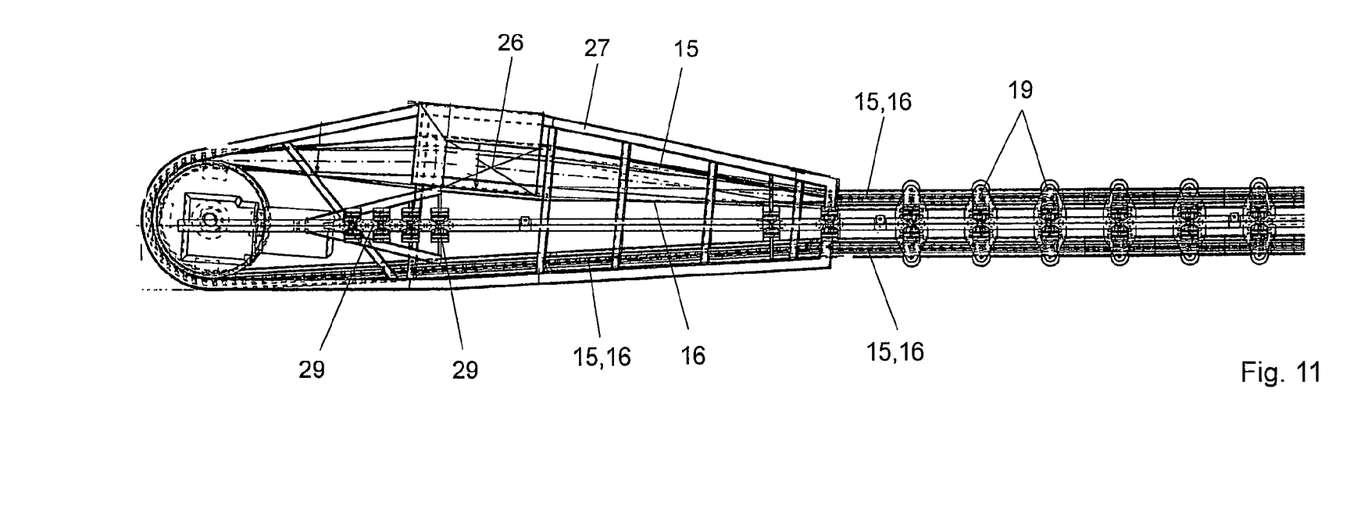

FIGS. 8 and 9 depict a hopper car 22 carrying a large reception chute 23 with a consecutive hopper. An integrated breaker performs precrushing of the haulage quantities to follow. The integrated anchor drilling and setting devices are schematically indicated by 36. From said hopper, an upward conveyor 24 transports the material to a transfer site of the closed-belt conveyor, which is schematically indicated by 26. The upward conveyor 24 is connected with the travelling mechanism 25 of the hopper car so as to be pivotable both vertically and laterally in order to ensure the curve-going ability. The delivery end of the closed-belt conveyor in this case is mounted on a support 27, which in turn is suspended from the suspension rail 3 via appropriate suspension members 28. The support 27 is designed such that the two belt edges of the closed-belt conveyor are conducted apart and brought together again to form a funnel, wherein, in order to enhance the curve-going ability, the support via rollers 29 is realized in such a manner as to enable also lateral excursions. This is illustrated in even more detail in FIGS. 10 and 11.

Figures 12, 13:
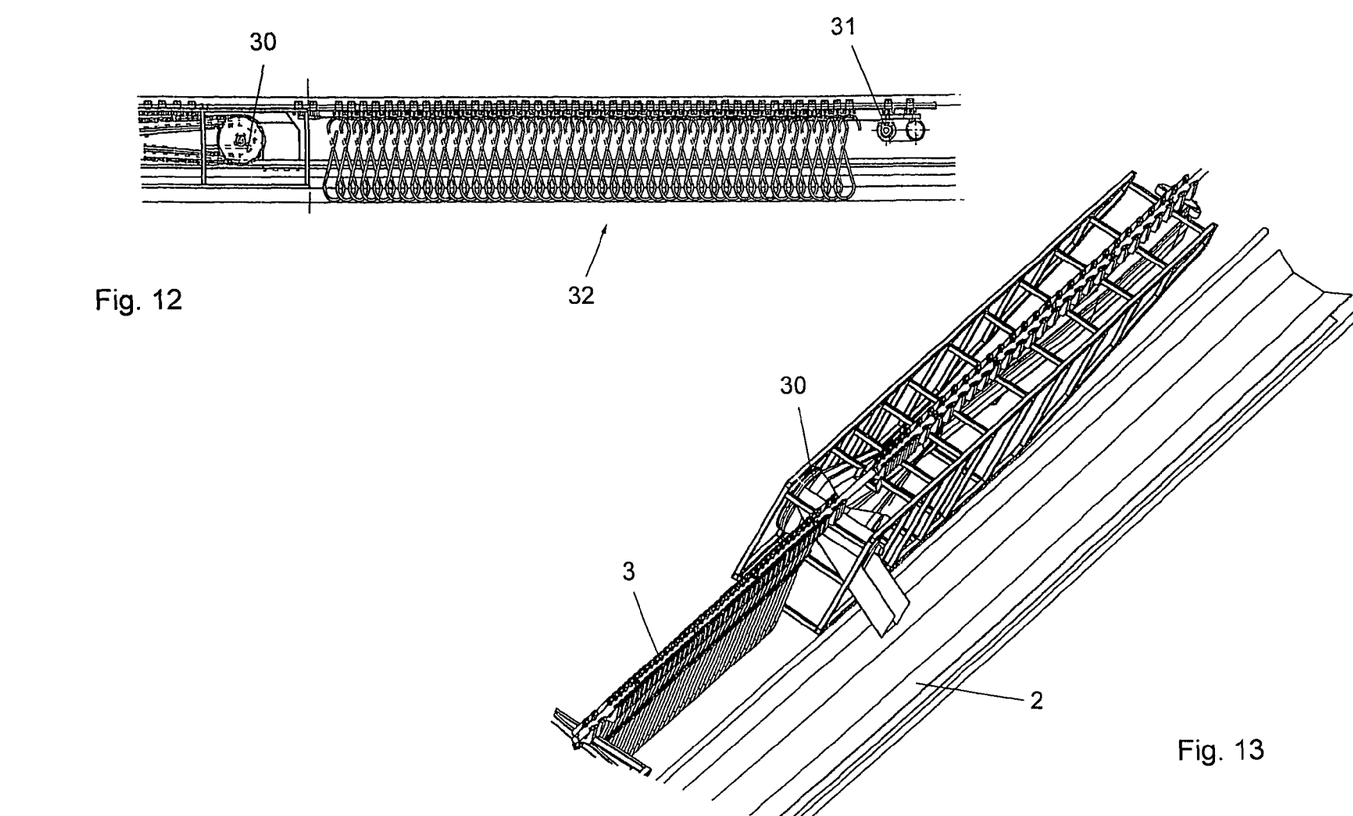
FIGS. 12 and 13 show details of the clamping device provided on the closed-belt conveyor end facing the stationary road haulage means.

FIGS. 12 and 13 schematically illustrate the closed-belt conveyor end facing the stationary road haulage means 2. The rear deflection pulley 30 is retained in a carrier fixed to the roof or the suspension rail via a bracing means by the aid of a rope winch 31. The power supply lines can be guided on support rollers of the monorail via cable drums or via cable suspensions as are schematically indicated by 32.

Figure 14:
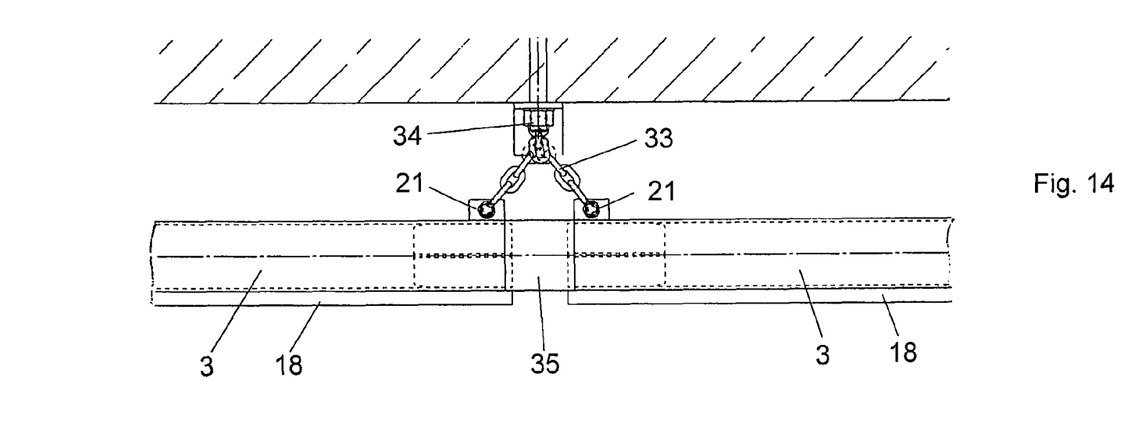
FIGS. 14 and 15 are side views of a monorail section, FIG. 15 being a perspective view of a connection piece for the extension of the suspended rail.
Figure 15:
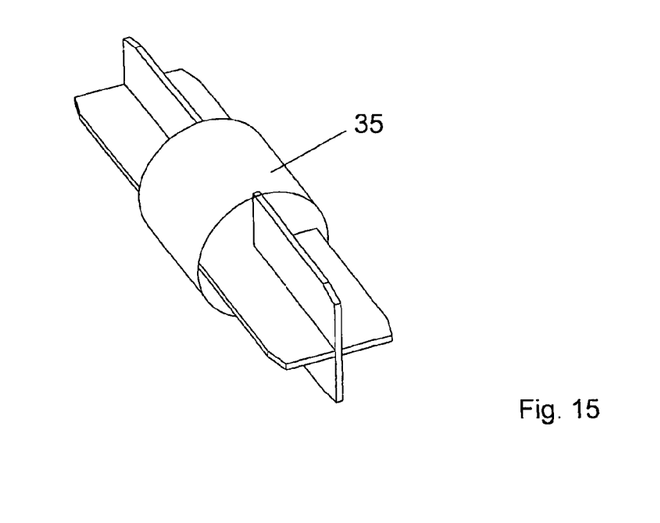

FIGS. 14 and 15 schematically illustrate the extensibility of the monorail 3, wherein the lugs 21 for engagement by a respective suspension member 33 are again visible. The respective roof anchor is denoted by 34. The two sections 3 of the suspension rail are connected with each other by plugging together, by the aid of an adapter 35 as illustrated on an enlarged scale in FIG. 15, thus ensuring the safe stability under the influence of gravity. The elastic plug-in element 35 is designed in such a manner as to ensure the correct orientation of adjacent sections of the suspension rail 3 and, in particular, the maintenance of the downwardly oriented flange 18 in a seam-right position.

The invention claimed is:

1. A haulage device for continuous removal of material excavated below ground, which can be continuously slaved between a mining machine and a continuous road haulage means over a defined path and narrow curve radii of the mining machine while hauling continuously without interruption, the haulage device comprising:

a closed-belt conveyor (9):
a suspended rail system (3); and
a movable transfer conveyor (7),
said closed-belt conveyor (9) being movable on the suspended rail system (3), and
said closed-belt conveyor (9) comprising
a receiving end arranged adjacent to the mining machine (8), and adapted to be coupled with the movable transfer conveyor (7), and a transfer end arranged away from the mining machine (8) and arranged adjacent to the continuous road haulage means (2),
said transfer end being connected with a clamping device exerting a defined tensile stress over a defined displacement path of the transfer end of the closed-belt conveyor (9) in a displaceable transfer position onto the continuous road haulage means (2).

2. A haulage device according to claim 1, wherein the clamping device is comprised of a rope winch (31) which is stationarily fixed in a road, and which comprises a rope,
said rope being arranged and adapted to be motorically wound up and off, and said rope being connected with a tension monitoring device.

3. A haulage device according to claim 2, wherein the receiving end of the closed-belt conveyor (9)
is mounted in a carrier (27) suspended from the suspended rail system (3) and is coupled with the moveable transfer conveyor (7), and
is displaceably mounted on the suspended rail system (3), so as to be displaceable transversely to a longitudinal direction of the suspended rail system (3), and to be adapted to form a funnel-shaped delivery end.

4. A haulage device according to claim 3, wherein the moveable transfer conveyor (7) comprises
a receiving hopper comprising
an integrated crushing means,
an upward conveyor (24),
a transfer chute or delivery site connected with the carrier (27).

5. A haulage device according to claim 2, wherein the moveable transfer conveyor (7) comprises at least one anchor drilling and setting device (36), by which anchors are set to provide extensions of the suspended rail system (3).

6. A haulage device according to claim 2, wherein the closed-belt conveyor (9) comprises
two tensile force-absorbing elements (15, 16) on belt edge sections of said closed-belt conveyor (9),
said elements (15, 16) both projecting into a same direction, transversely to a conveying direction of the closed-belt conveyor (9), and
said elements (15, 16) both being adjacently located parallel with each other in closed sections of the closed-belt conveyor (9).

7. A haulage device according to claim 2, wherein the tension monitoring device is a torque coupling.

8. A haulage device according to claim 1, wherein the receiving end of the closed-belt conveyor (9)
is mounted in a carrier (27) suspended from the suspended rail system (3) and is coupled with the moveable transfer conveyor (7), and
is displaceably mounted on the suspended rail system (3), so as to be displaceable transversely to a longitudinal direction of the suspended rail system (3), and to be adapted to form a funnel-shaped delivery end.

9. A haulage device according to claim 8, wherein the moveable transfer conveyor (7) comprises
a receiving hopper comprising
an integrated crushing means,
an upward conveyor (24), and
a transfer chute or delivery site connected with the carrier (27).

10. A haulage device according to claim 9, wherein the moveable transfer conveyor (7) comprises at least one anchor drilling and setting device (36), by which anchors are set to provide extensions of the suspended rail system (3).

11. A haulage device according to claim 9, wherein the closed-belt conveyor (9) comprises
two tensile force-absorbing elements (15, 16) on belt edge sections of said closed-belt conveyor (9),
said elements (15, 16) both projecting into a same direction, transversely to a conveying direction of the closed-belt conveyor (9), and
said elements (15, 16) both being adjacently located parallel with each other in closed sections of the closed-belt conveyor (9).

12. A haulage device according to claim 8, wherein the moveable transfer conveyor (7) comprises at least one anchor drilling and setting device (36), by which anchors are set to provide extensions of the suspended rail system (3).

13. A haulage device according to claim 8, wherein the closed-belt conveyor (9) comprises
two tensile force-absorbing elements (15, 16) on belt edge sections of said closed-belt conveyor (9),
said elements (15, 16) both projecting into a same direction, transversely to a conveying direction of the closed-belt conveyor (9), and
said elements (15, 16) both being adjacently located parallel with each other in closed sections of the closed-belt conveyor (9).

14. A haulage device according to claim 1, wherein the moveable transfer conveyor (7) comprises at least one anchor drilling and setting device (36), by which anchors are set to provide extensions of the suspended rail system (3).

15. A haulage device according to claim 14, wherein the closed-belt conveyor (9) comprises
two tensile force-absorbing elements (15, 16) on belt edge sections of said closed-belt conveyor (9),
said elements (15, 16) both projecting into a same direction, transversely to a conveying direction of the closed-belt conveyor (9), and
said elements (15, 16) both being adjacently located parallel with each other in closed sections of the closed-belt conveyor (9).

16. A haulage device according to claim 1, wherein the closed-belt conveyor (9) comprises
two tensile force-absorbing elements (15, 16) on belt edge sections of said closed-belt conveyor (9),
said elements (15, 16) both projecting into a same direction, transversely to a conveying direction of the closed-belt conveyor (9), and
said elements (15, 16) both being adjacently located parallel with each other in closed sections of the closed-belt conveyor (9).

17. A haulage device according to claim 16, wherein the suspended rail system (3) comprises suspension members (19), and wherein each of said suspension members (19)
comprises a carrier (10) including support rollers (17),
said support rollers (17) each
engaging from below said carrier (10), and
rollingly supporting a first one of the tensile force-absorbing elements (15) of the belt edge sections directly, and a second one of the tensile force-absorbing elements (16) of the belt edge sections indirectly, via an interposition of the first one of the tensile force-absorbing elements (15), and
wherein at least two support wheels (13) are arranged on the carrier (10) transversely to a belt running direction, and said support wheels (13) cooperate with the tensile force-absorbing elements (15, 16) to keep the belt edge sections closed.

18. A haulage device for continuous removal of material excavated below ground, which can be continuously slaved between a mining machine and a continuous road haulage means over a defined path and narrow curve radii of the mining machine while hauling continuously without interruption, the haulage device comprising:
- a closed-belt conveyor (9):
- a suspended rail system (3); and
- a movable transfer conveyor (7),
    - said closed-belt conveyor (9) being movable on the suspended rail system (3), and
    - said closed-belt conveyor (9) comprising
        - a receiving end arranged adjacent to the mining machine (8), and adapted to be coupled with the movable transfer conveyor (7),
        - a transfer end arranged away from the mining machine (8) and arranged adjacent to the continuous road haulage means (2),
            - said transfer end being connected with a clamping device exerting a defined tensile stress over a defined displacement path of the transfer end of the closed-belt conveyor (9) in a displaceable transfer position onto the continuous road haulage means (2),
- wherein the clamping device is comprised of a rope winch (31) which is stationarily fixed in a road, and which comprises a rope,
    - said rope being arranged and adapted to be motorically wound up and off, and said rope being connected with a torque coupling,
- wherein the receiving end of the closed-belt conveyor (9)
- is mounted in a carrier (27) suspended from the suspended rail system (3) and is coupled with the moveable transfer conveyor (7), and
- is displaceably mounted on the suspended rail system (3), so as to be displaceable transversely to a longitudinal direction of the suspended rail system (3), and to be adapted to form a funnel-shaped delivery end,
- wherein the moveable transfer conveyor (7) comprises a receiving hopper comprising
    - an integrated crushing means,
    - an upward conveyor (24), and
    - a transfer chute or delivery site connected with the carrier (27),
- wherein the moveable transfer conveyor (7) comprises at least one anchor drilling and setting device (36), by which anchors are set to provide extensions of the suspended rail system (3),
- wherein the closed-belt conveyor (9) comprises
- two tensile force-absorbing elements (15, 16) on belt edge sections of said closed-belt conveyor (9),
    - said elements (15, 16) both projecting into a same direction, transversely to a conveying direction of the closed-belt conveyor (9), and
    - said elements (15, 16) both being adjacently located parallel with each other in closed sections of the closed-belt conveyor (9),
- wherein the suspended rail system (3) comprises suspension members (19), and wherein each of said suspension members (19)
- comprises a carrier (10) including support rollers (17),
    - said support rollers (17) each
        - engaging from below said carrier (10), and
        - rollingly supporting a first one of the tensile force-absorbing elements (15) of the belt edge sections directly, and a second one of the tensile force-absorbing elements (16) of the belt edge sections indirectly, via an interposition of the first one of the tensile force-absorbing elements (15), and
- wherein at least two support wheels (13) are arranged on the carrier (10) transversely to a belt running direction, and said support wheels (13) cooperate with the tensile force-absorbing elements (15, 16) to keep the belt edge sections closed.

* * * * *